United States Patent Office 3,260,641
Patented July 12, 1966

3,260,641
VULCANIZATION BONDING OF ETHYLENE ALPHA-OLEFIN COPOLYMER WITH A CHLOROSULFONATED COPOLYMER INNER LAYER
Luigi Falcone, Milan, Italy, assignor to Montecatini, Società Generale per l'Industria Mineraria e Chimica, Milan, Italy, a corporation of Italy
No Drawing. Filed May 26, 1961, Ser. No. 112,784
8 Claims. (Cl. 161—242)

The present invention relates to the preparation of co-vulcanizable mixes and vulcanized articles containing successive layers of natural or synthetic rubber, modified olefin copolymers and unmodified copolymers. Natural rubber, as is well known in the art is uncured and unvulcanized. More particularly, the present invention relates to mixes containing layers of natural or synthetic rubber, a copolymer of ethylene with propylene or butene-1 containing chlorosulphonic groups, which copolymer may be mixed with rubber or other resins, and an unmodified copolymer of ethylene with propylene or butene-1.

In the field of synthetic rubbers, compatibility with natural rubber is considered a valuable property.

This compatibility is often considered only in terms of the possibility of co-vulcanization. Olefin copolymers of ethylene with propylene or butene-1, due to their paraffinic nature, can be co-vulcanized with natural rubber with the aid of organic peroxides as vulcanizing agents. The olefin copolymer and natural rubber can be mixed in a roll mixer and the end product appears to be homogeneous. However, if these two compounds are merely contacted and then subjected to vulcanization by heating in a press, it is observed that the two layers can easily be separated. There is therefore a difference between a compatibility with the vulcanizing agents and a physical compatibility depending on how easily the different molecules of the natural synthetic rubber and the olefin copolymer can diffuse through each other. Thus, the compatibility of a vulcanizing agent with both both types of polymer material does not imply the physical compatibility of one polymer with the other.

If reference is made to the free mixing energy (as defined e.g., in "Principles of Polymer Chemistry," P. Flory, 1953, page 507), it can be seen that in the field of macromolecular substances the reciprocal diffusion of different molecules is not favored thermodynamically because of the low entropy contribution which results from the relatively small number of molecules involved.

The copolymers of ethylene with propylene or butene-1, it is found, are completely incompartible with natural or synthetic rubber owing to the difference in the chemical structures of the two substances and to the limited reciprocal diffusion of their molecules. Olefin copolymers are substantially completely saturated while natural or synthetic rubber is highly unsaturated. For several industrial applications it would be extremely useful to have co-vulcanizable mixes which would thus lead to the production of vulcanized articles containing natural or synthetic rubber and olefin copolymer layers tightly sealed to each other giving products which combine the good properties of natural rubber with the valuable characteristics of a saturated elastomer.

The present invention provides co-vulcanizable mixes and, thus, vulcanized articles of natural or syntheic rubber and an olefin copolymer, in which both substances are firmly joined to each other. Under synthetic rubber, rubbers structurally similar to natural rubber such as polybutadiene 1-4 cis and polyisoprene 1-4 cis are meant. It has been found that when chlorosulphonic groups are introduced into the olefin copolymer, the resulting chlorosulphonated copolymer functions to make the unmodified copolymer physically compatible with natural rubber. If two layers, comprising natural or synthetic rubber and a chlorosulphonated copolymer, respectively, are heated in a press, the fusion of the two layers is surprisingly achieved. This fusion leads to a considerable molecular diffusion between the two substances and the formation, and in the presence of vulcanizing agents leads to the formation of mixed bridges between the copolymer and the rubber.

The present invention also provides a method of vulcanizing an olefin copolymer onto a support material using a chlorosulphonated olefin copolymer as an adhesive.

The chlorosulphonated copolymer appears to be physically compatible with the untreated olefin copolymer as such. This makes it possible to obtain the desired adhesion of the copolymer to natural or synthetic rubber by interposing a layer of chlorosulphonated copolymer. It has been found that the layer of modified copolymer can be replaced by an adhesive prepared by dissolving the chlorosulphonated copolymer in a hydrocarbon solvent of the aliphatic series, such as heptane, a solvent of the aromatic series, such as toluene, or by dissolving in a chlorinated hydrocarbon such as carbon tetrachloride.

An advantage of the present invention is that the undesired interference of conventional vulcanization agents for diolefin rubbers such as sulphur and the like and conventional rubber accelerators such as diphenyl guanidine and the like, with the action of the peroxide vulcanizing agents for the copolymer, is avoided by this intermediate chlorosulphonated copolymer layer which prevents direct contact between the treating agents for the two different materials. This permits the co-existence and the separate action of the different agents in their respective external layers and a surprisingly synergic vulcanisation in the intermediate layer of chlorosulphonated copolymers, the amounts of the vulcanizing agents being the same. The use of the underlayer or adhesive of the chlorosulphonated olefin copolymer makes it possible to join the copolymer with any commercial product containing crude natural rubber.

It has also been found that as an intermediate layer for the co-vulcanization, or as an adhesive, a mix of the chlorosulphonated copolymer with natural or synthetic rubber and/or with synthetic resins, which are capable of increasing the cold adhesivity, such as phenol-formaldehyde resins and colophony based resins (Staybelite or the like), can advantageously be used (see Modern Plastic Encyclopedia, 1961, "Adhesive Chart." These resin materials impart to the chlorosulphonated copolymer the adhesivity required for the cold shaping of articles.

Other advantages and objects of the present invention will be obvious from the following description and working examples.

Copolymers of ethylene with propylene or butene-1 and the methods for vulcanizing them are described in British Patent Specifications 856,736 and 856,737, respectively. These copolymers contain from 10% to 80% ethylene by mols and have a molecular weight (viscosimetrically determined: see the article of Moraglio in La Chimica e l'Industria 41, 984, 1959) of from 50,000 to 600,000 and above. They can be vulcanized with various vulcanizing agents, but, according to the present invention, vulcanization is preferably carried out with peroxides and sulphur, in ratios of amounts of sulphur to peroxide between 0.1:1 and 3:1 preferably 0.3:1 and 1.5:1, most preferably 1 gram atomic weight sulphur per 1 mol peroxide. The chlorosulphonated copolymer contains from 0.5% to 35%, preferably from 5% to 25% chlorine and from 0.01% to 5%, preferably from 0.1 to 3% sulphur. Any mono- or di-peroxide suitable in the vulcanization of saturated, amorphous polymers such as cumyl-, ditert. butyl-, diter. butyltetrachloride-, 2-5 dimethyl (2,5- diperoxiditerbutyl)-hexane, -peroxide may be used. The vulcanization is carried out at from 120° to 220° C. preferably from 140° to 180° C.

The present invention is illustrated but not limited by the following examples:

*Example 1*

In Table I is reported the composition of the certain mixes according to the present invention. In Table II is shown compositions of the chlorosulphonated copolymer-based adhesives. In Table II is shown the results of the peeling tests carried out according to ASTM D 413–39. The specimens containing the adhesive layer were vulcanized in a press for 40 minutes at 165° C.

The chlorosulphonated copolymer used had a chlorine content of about 10% and a sulphur content of 1% to 1.5%.

TABLE I

| Ingredients | Composition of the Mix | | | |
|---|---|---|---|---|
| | a | b | c | d |
| Copolymer ethylene-propylene or ethylene-butene containing 50% moles ethylene | 100 | 100 | | |
| Natural rubber | | | 100 | 100 |
| Carbon black HAF (high abrasion furnace) | 50 | | 50 | |
| Carbon black EPC (easy processing channel) | | 50 | | |
| ZnO | | | 5 | 5 |
| Durosil (silica) | | | | 50 |
| TiO$_2$ | | | | |
| MgO | | 2 | | |
| Santocure (cyclohexyl sulphamide) | | | 1.2 | 1.2 |
| Diphenylguanidine | | 1 | 0.5 | 0.5 |
| Sulphur | 0.3 | 0.3 | 2.5 | 2.5 |
| Tertiary butyl cumyl peroxide | 2 | 2 | | |

TABLE II

| Ingredients | Composition of the Adhesive | | | |
|---|---|---|---|---|
| | CS$_1$ | CS$_2$ | CS$_3$ | CS$_4$ |
| Chlorosulphonated copolymer C$_2$-C$_3$ | 100 | 100 | 100 | 100 |
| Natural rubber | 20 | | | |
| TiO$_2$ | 20 | 20 | | 20 |
| Carbon black SAF (super abrasion furnace) | | | 50 | |
| MgO | | | 2 | |
| Diphenylguanidine | 2 | 2 | 2 | |
| Tertiary butyl cumyl peroxide | 1 | 1 | 1 | |
| Sulphur | 3 | 3 | 3 | |
| Staybelite (rosin resin) | 2.8 | 2.8 | 2.8 | |
| Phthalic acid | | | | 5 |
| Thiuram M (tetramethyl thiuram disulphide) | | | | 2 |
| Tetram A | | | | 1 |
| Durosil (silica) | 50 | 50 | | 50 |

C$_2$-C$_3$ = ethylene-propylene copolymer.

*Example 2*

A chlorine and sulphur dioxide current is passed through a solution of ethylene-propylene copolymer in carbon tetrachloride under actinic radiation. The copolymer is about 50:50 mols percent ethylene-propylene and has a molecular weight of about 150,000. When the reaction is completed a product containing about 15% chlorine and about 1.5% sulphur is isolated. Using the chlorosulphonated copolymers, mixes are prepared in a roll mixer as reported in Table IV. The mixes thus obtained are dissolved in heptane and the adhesives obtained are indicated by CS.

TABLE IV

| Ingredients | Composition of the Adhesives | | | |
|---|---|---|---|---|
| | CS$_1$ | CS$_2$ | CS$_3$ | CS$_4$ |
| Chlorosulphonated copolymer (ethylene-propylene, ethylene-butene) | 100 | 100 | 100 | 100 |
| Natural rubber | 20 | | | |
| Durosil (silica) | 50 | 50 | | 50 |
| TiO$_2$ | 20 | 20 | | 20 |
| Carbon black SAF (super abrasion furnace) | | | 50 | |
| MgO | | | 2 | 20 |
| Diphenylguanidine | 2 | 2 | 2 | |
| Tertiary butyl cumyl peroxide | 1 | 1 | 1 | |
| Sulphur | 3 | 3 | 3 | |
| Staybellite (rosin resin) | 2.8 | 2.8 | 2.8 | |
| Phthalic acid | | | | 5 |
| Thiuram M (tetramethyl thiuram disulphide) | | | | 2 |
| Tetrone A (dipenta methylene-thiuram tetrasulphide) | | | | 1 |
| | | | | 1 |

The copolymer and natural rubber contents of the mixes used are reported in Table V.

TABLE V

| Ingredients | Composition of the Mixes | | | | | |
|---|---|---|---|---|---|---|
| | a | b | c | d | e | f |
| Ethylene-propylene copolymer | 100 | 100 | | | | |
| Ethylene-butene copolymer | | | | | 100 | 100 |
| Natural rubber | | | 100 | 100 | | |
| Carbon black HAF (high abrasion furnace) | 50 | | 50 | | 50 | |
| Carbon black IPC (intermediate processing channel) | | 50 | | | | 50 |
| ZnO | | | 5 | 5 | | |
| Durosil (silica) | | | | 50 | | |
| MgO | | 2 | | | | 2 |
| Santocure (cyclohexyl sulphamide) | | | 1.2 | 1.2 | | |
| Diphenylguanidine | | 1 | 0.5 | 0.5 | | 1 |
| Sulphur | 0.3 | 0.3 | 2.5 | 2.5 | 0.3 | 0.3 |
| Tertiary butyl cumyl peroxide | 2 | 2 | | | 2 | 2 |

The adhesive is spread in the form of a very thin layer onto the contact surfaces of the copolymer and natural rubber and vulcanization is carried out in a press at 160° C. for 40 minutes.

TABLE III

Peeling Values

| Adhesives | Copolymer (a) GN[1] (c) | | Copolymer (b) GN (c) | | Copolymer (b) GN (d) | | Rubber Ply Michelin | | | |
|---|---|---|---|---|---|---|---|---|---|---|
| | | | | | | | Copolymer (a) | | Copolymer (b) | |
| | kg./cm. | lb./in. | kg./cm. | lb./in. | kg./cm. | lb./in. | kg./cm. | lb./in. | kg./cm. | lb./in. |
| CS$_1$ | 13 | 72.8 | 17 | 95.2 | 16 | 89.6 | [2] 12 | 67.2 | [2] 12 | 67.2 |
| CS$_2$ | 13 | 72.8 | | | | | | | | |
| CS$_3$ | 13 | 72.8 | [3] | | | | | | | |
| CS$_4$ | 8 | 44.8 | 12 | 67.2 | 10 | 56.0 | | | | |
| Natural rubber solution plus peroxide and sulphur | | | | | | | 3 | 16.8 | 5 | 28.0 |
| Without adhesive | | | | | [4] | | | | 3 | 16.8 |

Legend—
[1] GN Natural rubber.
[2] Rubber detaches from the ply.
[3] Specimen breaks outside the adhesion surface.
[4] Does not adhere.

From the sheets thus obtained, some specimens are prepared. These specimens are then subjected to peeling tests according to ASTM D 413-39. In Table VI the results obtained, express as kg./cm. and pounds/inch, are reported.

TABLE VI

| Adhesives | Peeling values—Joined mixes | | | | | |
|---|---|---|---|---|---|---|
| | a-c | | b-c | | b-d | |
| | kg./cm. | pounds/inch | kg./cm. | pounds/inch | kg./cm. | pounds/inch |
| $CS_1$ | 13 | 72.8 | 17 | 95.2 | 16 | 89.6 |
| $CS_2$ | 13 | 72.8 | | | | |
| $CS_3$ | 13 | 72.8 | (¹) 12 | 67.2 | 10 | 56.0 |
| $CS_4$ | 8 | 44.8 | | | | |

Legend—
¹ Specimen breaks outside the adhesion surface.

*Example 3*

Adhesive $CS_1$ of Table IV is employed for joining mixes of copolymer (see Table V) and a commercial rubber-coated fabric. In the tensile tests the peeling value between copolymer and natural rubber cannot be determined since during the tension the weaker bond, that is, the natural rubber-to-fabric bond gives way. The results of these tests are reported in Table VII, in which they are compared with a test carried out with an adhesive based on natural rubber and with a test in which the copolymer surface is contacted directly with the natural rubber surface.

The adhesive based on natural rubber was prepared by dissolving in heptane a natural rubber mix having the following composition:

Natural rubber _____ 100
Carbon black HAF _____ 50
Tertiary butyl cumyl peroxide _____ 2
Sulphur _____ 0.3

(See Table VII, appended.)

*Example 4*

A scooter-tire (size 4.00-8) was prepared from plies coated with conventional natural rubber and treads consisting of the following mix containing an unmodified ethylene-propylene copolymer:

Copolymer _____ 100
Carbon black HAF _____ 50
Sulphur _____ 0.3
Tertiary butyl cumyl peroxide _____ 2

The plies were cut at an angle of 60° and were placed with their edges on a drum.

Thereafter, adhesive $CS_1$ (Table IV) was spread on the larger base of the trapezoidal extruded tread, and a very thin layer (about 0.8 mm.) of natural rubber, contained from mix d of Table V was applied thereon.

The tread is then placed on the rubber-coated plies supported by the drum. The shaping is carried out with the technique used in apparatus of the "bag-o-matic" type at about 1-2 atmospheres with water vapor. The vulcanizing is then carried out for about 1 hour with steam under 7 atmospheres inside the bladder and under 8 atmospheres outside the mold. The tire thus prepared is tested for 2,000 km. on a knurled-surface "road-wheel" having a diameter of 35 cm., with an axial load of 160 kg., at a speed of 80 km./hour. During the test the tire reaches a temperature of about 60° C. on the outer surface. More severe tests are also carried out using increasing axial loads. With a load of 250 kg., it is observed that the plies break after a few hours, in the area of the bending zone, but no separation of the tread from the plies is noted. A tire prepared in the same manner, but made entirely of natural rubber behaves in a similar manner in the tests on the road-wheel.

*Example 5*

A worn 5.20-14 car tire was rasped and retreaded with a tread made of unmodified copolymer (mix of Example 4). An under-layer of natural rubber (mix d, Table V) was interposed between the tread and the carcass. The use of this under-layer makes the application of the tread to the carcass easier. Adhesive $CS_1$ (Table IV) was used as a binder between the natural rubber under-layer and the copolymer tread, while in order to facilitate the joining of the under-layer to the carcass, which is made of vulcanized natural rubber, an adhesive prepared by dissolving mix d of Table V in heptane is used.

The vulcanization is carried out for 1½ hours under 8 atmospheres of steam, with a molding pressure, obtained with water pressure of about 20 atmospheres. The tire, tested on the knurled "road-wheel" with a diameter of 88 cm., for 2000 km. at a speed of 60 km./hour with an axial load of 500 kg., did not show any stripping.

The tire was then destroyed and in the portion corresponding to the adhesion zone, a peeling value of 18 kg./cm. is found.

TABLE VII.—ADHESION TO COMMERCIAL RUBBER-COATED FABRICS

| Adhesive | Copolymer Mix Used | | | | | | | |
|---|---|---|---|---|---|---|---|---|
| | a | | b | | c | | d | |
| | kg./cm. | p./inch | kg./cm. | p./inch | kg./cm. | p./inch | kg./cm. | p./inch |
| $CS_1$ | ¹ 12 | ¹ 67.2 | ¹ 12 | ¹ 67.2 | ¹ 12 | ¹ 67.2 | ¹ 12 | ¹ 67.2 |
| Natural rubber adhesive | 3 | 16.8 | 5 | 28.0 | 2 | 11.2 | 4 | 22.4 |
| Without adhesive | (²) | | 3 | 16.8 | 2 | 11.2 | 4 | 22.4 |

Legend—
¹ Natural rubber is stripped from the fabric.
² Does not adhere.

*Example 6*

A conveyor belt, having a width of 80 cm. and a thickness of 0.9 cm., is prepared with commercial rubber-coated cloths. Three of these cloths were assembled and then interposed between two copolymer sheets having a thickness of 3 and 2 mm., respectively. Adhesive $CS_1$ (see Table IV) was spread on the natural rubber-to-copolymer contact surfaces.

After the vulcanization in a press, some specimens to be used for peeling tests were cut from the belt.

Since the adhesion value between natural rubber and copolymer is higher than that between natural rubber and the fabric, the rubber-to-copolymer could not be exactly determined. As a copolymer, the following mix was used:

| | |
|---|---|
| Copolymer | 100 |
| Carbon black ISAF | 60 |
| Sulphur | 0.3 |
| Di-tertiary butyl cumyl peroxide | 2 |

*Example 7*

A chlorine and sulphur dioxide current is passed through an ethylene-butene copolymer solution in $CCl_4$ under actinic radiation. The copolymer had the following characteristics:

| | |
|---|---|
| Ethylene content, mol percent | 50 |
| Molecular weight | 130,000 |

At the end of the reaction (after about 1 hour), the copolymer had a chlorine content of 12% and a sulphur content of 1.8%. Using this chlorosulphonated copolymer, the mixes reported in Table IV were prepared. The various mixes thus obtained were dissolved in heptane and the adhesives obtained are indicated by CS in Table IV.

In Table V, columns *c*, *d*, *e* and *f*, the various mixes used are reported. The adhesive is employed as described in Example 2. The vulcanization and the peeling tests are carried out as in Example 2. The results, expressed as kg./cm. and pounds/inch are reported in Table VIII.

TABLE VIII

| Adhesives | Joined Mixes | | | | | |
|---|---|---|---|---|---|---|
| | e-c | | f-c | | f-d | |
| | kg./cm. | pounds/inch | kg./cm. | pounds/inch | kg./cm. | pounds/inch |
| $CS_1$ | 14 | 78.4 | 16 | 89.6 | 16 | 89.6 |
| $CS_2$ | 14 | 4 | | | | |
| $CS_3$ | 14 | 4 | | | | |
| $CS_4$ | 10 | 56.0 | 13 | 72.8 | 10 | 56.0 |

The adhesives of the example may be employed in the same applications as described in Examples 3 to 6, with the obtaining of results similar to those obtained with adhesives containing chlorosulphonated ethylene-propylene copolymers.

*Example 8.—Adhesion of ethylene-propylene copolymer to metals*

Tests were carried out according to ASTM D 429–56 T, using carbon steel plates. A layer of resorcinol-formaldehyde resin was spread onto the metal; either no adhesive or the adhesive $CS_1$ (Table IV) was spread on mix *a* (Table V). The test and the results are reported in Table IX. It will be seen that the use of the adhesive improves the resistance to peeling considerably. Analogous results were obtained using adhesives $CS_2$, $CS_3$, and $CS_4$.

TABLE IX

| Combination | Resistance to Peeling, kg./cm.² |
|---|---|
| Metal— Resorcinol-formaldehyde resin, Mix a | 20-25-23-30-26 |
| Metal— Resorcinol-formaldehyde resin $CS^1$, Mix a | 46-47-36-52-45 |

The peeling tests were carried out on different specimens according to the above ASTM D 413–39.

*Example 9.—Adhesion of ethylene-propylene copolymer to fabrics*

A "cord" type rayon fabric treated according to a known method with a resorcinol-formaldehyde resin in a natural rubber latex, was immersed in a heptane solution of sulphorchlorinated polymer (mix $CS_2$ and $CS_4$; see Table IV). The fabric is suitably wrung and then dried in a current of warm air. Yarns of the cord are then taken and used for carrying out some tests of adhesion to ethylene-propylene copolymers (mix *a*; see Table V), according to the method "H Test." (Rubber Chemistry and Technology; Volume XX; Number 1, 1947; page 268.)

In Table X are reported the conditions of the test and the values of adhesion between the "cord" fabric and the copolymer mix.

The results show the improvements obtained by pretreating the fabric with a solution of sulphochlorinated polymer.

TABLE X

Test Conditions—

| | |
|---|---|
| Diameter of the yarn, mm | 0.47 |
| Working length of the yarn, mm | 9.0 |
| Adhesion surface of the yarn, cm² | 0.133 |
| Tractive speed, mm./minute | 300 |

Results

| Resistance to Peeling, kg./cm.² | Average Value | Notes |
|---|---|---|
| 52.5–71.5–36.0 49.0–67.5–46.5 64.0–50.0–41.0 41.0 | 51.9 | Fabric treated with a solution of sulphochlorinated polymer ($CS_1$). |
| 47.3–57.1–45.1 45.1–53.9–52.6 | 50.19 | Fabric treated with a solution of sulphochlorinated polymer ($CS_4$). |
| 30.0–28.6–22.6 24.8–28.1–27.8 26.3 | 26.7 | Fabric not treated with a solution of sulphochlorinated polymer. |

*Example 10*

In following example a further feature advantage of the use of chlorosulfonated copolymer in the retreading of big tires or in the integral retreading of normal tires is pointed out; in these cases a central strip, two strained pieces with a triangular section and two calendered sheets are combined, but during the moulding operation the natural rubber substratum which is more plastic, penetrates by sliding between the covering pieces formed of copolymer and creates weak attack zones just where the external stresses are high.

This inconvenience may be seen by operating as follows:

A 12.00–20 tire, after rasping, is retreaded with a cap obtained by straining following mix (1)

| | Parts |
|---|---|
| Ethylene-propylene copolymer | 100 |
| Carbon black HAF | 50 |
| Cumyl peroxide | 2.5 |
| Sulfur | 0.3 |

(1) Copolymer containing ethylene-propylene in the ratio of 1:1, with a molecular weight of about 100,000 and a Mooney plasticity (1+4 at 100° C.) of 50.

A side of the cap is spread with an adhesive obtained by dispersing in heptane the following mix (2)

| | Parts |
|---|---|
| Sulfochlorinated ethylene-propylene copolymer (sulfur content 1%, chlorine content 10%) | 100 |
| Natural rubber | 20 |
| Durosil (silicic acid) | 50 |
| $TiO_2$ | 20 |
| MgO | 2 |
| DPG (diphenyl guanidine) | 1.0 |
| Sulfur | 2.8 |
| Tert. butyl cumyl peroxide | 3.0 |

A mix (3) natural rubber having the following composition is then prepared:

| | Parts |
|---|---|
| Natural rubber | 100 |
| 2246 antioxidant | 1 |
| Durosil (white silica) | 50 |
| ZnO | 5 |
| DPG (diphenyl guanidine) | 0.5 |
| Santocure | 1.2 |
| Sulfur | 2.5 |

This white mix (3) is drawn in the form of a sheet having a thickness of 0.8÷1 mm. and is applied on the tread side on which the aforementioned chlorosulfonated copolymer adhesive (2) has previously been spread.

The tread provided with this substratum of white natural rubber (3) is wound upon the carcass spread with a commercial adhesive of the type normally used by retreaders.

The tread size is 230 x 16 mm. and only the central zone of the carcass is therefore retreaded.

Two strained pieces having a triangular section are then prepared from the copolymer mix (1) and provided with a substratum according to the aforementioned technique. They are then applied to the carcass to connect the central substratum with the tire sidewalls.

The tire is then kept at 170° C. for 2 hours. When the vulcanization is completed the tire is withdrawn from the mould and infiltration towards the outer side of the substratum are observed in the contact zones of the triangular strained pieces used for retreading.

The tire is successively used in the road abrasion tests. After a few kilometers of running a detaching is noted in correspondence with the aforementioned infiltrations.

Operating now with the following special technique, the above drawback is eliminated and good retreaded tires are obtained.

For retreading a 12.00–20 tire a sheet of a black mix having the same composition as the tread or cap of mix 1 is inserted between same cap and the white substratum of natural rubber mix (3).

The substratum thus consisting of a sheet of white natural rubber (3) and a sheet of black copolymer (1) bonded together by a layer of chlorosulfoned adhesive mix (2), is directly applied to the carcass.

Successively the central tread strip and the two strained pieces having triangular section (for connecting the central tread strip with the tire side-walls) are applied in this order on the carcass.

When the vulcanization is completed, no white infiltration is noted. The tire, subjected to road tests, presents the characteristics of a tire retreaded with a tread which behaves as a single extruded piece.

The latter technique is particularly advantageous since, once the adhesion between the two substrates consisting of the black mix on the basis of copolymer and of a white mix on the basis of natural rubber is granted by the sulfochlorinated adhesive, it makes it possible to eliminate any other inconvenience and to carry out the retreading by applying more than one strained sheet onto the carcass.

In all the examples ethylene-propylene or ethylene-butene examples may be used interchangeably.

Many variations and modifications can of course be practiced without departing from the spirit of the present invention.

Having thus described the invention, what it is desired to secure and claim by Letters Patent is:

1. A process for vulcanizing and bonding an elastic saturated copolymer of ethylene and a higher alpha-olefin having the formula $RCH_2$—$CH=CH_2$, where R is selected from the group of hydrogen and methyl onto a layer of uncured natural rubber which comprises placing between the rubber to be cured and the saturated copolymer to be vulcanized and bonded to the rubber, an interlayer comprising a vulcanization adhesive consisting essentially of an elastomeric chlorosulfonated copolymer of ethylene and a higher alpha-olefin having the formula $RCH_2$—$CH=CH_2$, where R is selected from the group of hydrogen and methyl, an organic peroxide, a sulfur curing agent, uncured natural rubber and a reinforcing filler, subsequently heating the assembled members at a temperature ranging from 110° to 220° C. for a period of about ten to twenty minutes under pressure until said saturated copolymer layer and said rubber layer are co-vulcanized and a solid bond between the rubber layer and the saturated copolymer layer is obtained.

2. A process according to claim 1, in which the chlorosulphonated copolymer is dissolved in a hydrocarbon solvent prior to being placed between the uncured rubber layer and the saturated copolymer layer.

3. A process according to claim 1, in which said uncured natural rubber layer is a coating on a tire ply and in which said saturated copolymer layer is a tire tread.

4. A process according to claim 1, in which the saturated copolymer layer is a tire tread and in which prior to the vulcanization and bonding step said layer of uncured natural rubber is placed between the retread and a tire carcass.

5. A product comprising at least one layer of vulcanized copolymer of ethylene and higher alpha-olefin having the formula $RCH_2$—$CH=CH_2$, where R is selected from the group of hydrogen and methyl, at least one layer of vulcanized natural rubber, said layers having been bonded together and covulcanized with an adhesive consisting essentially of a chlorosulfonated copolymer of ethylene and a higher alpha-olefin having the formula $RCH_2$—$CH=CH_2$, where R is selected from the group consisting of hydrogen and methyl, an organic peroxide, a sulfur curing agent, uncured natural rubber, and a reinforcing filler.

6. A product according to claim 5, in which the product is a tire and contains in addition to the layer of rubber and layer of copolymer, at least one tire ply and in which the said layer of copolymer is a tire tread and in which the layer of rubber is a coating on said tier ply and in which said tire ply is bonded to the tire tread by means of said adhesive and said coating of rubber.

7. A product according to claim 5, in which the product is a tire which contains a tire carcass, the copolymer layer is a retread, and in which the layer of rubber is a layer interposed between the retread and the tire carcass.

8. A product according to claim 5, in which the product is a conveyor belt containing at least one layer of cloth and the layer of rubber is a coating on said cloth.

References Cited by the Examiner

UNITED STATES PATENTS

| | | | |
|---|---|---|---|
| 1,904,502 | 4/1933 | Michelin | 161—221 |
| 2,577,843 | 12/1951 | Crosby et al. | 161—222 |
| 2,630,398 | 3/1953 | Brooks et al. | 156—99 |
| 2,710,291 | 6/1955 | Little | 260—79.5 |
| 2,711,986 | 6/1955 | Strain et al. | 156—327 |
| 2,793,151 | 5/1957 | Arnett | 138—126 |
| 2,812,278 | 11/1957 | Boger | 156—333 |
| 2,822,026 | 2/1958 | Willis | 156—135 |

(Other references on following page)

UNITED STATES PATENTS

| | | | |
|---|---|---|---|
| 2,879,261 | 3/1959 | Johnson et al. | 260—79.3 |
| 2,925,354 | 2/1960 | Berardinelli et al. | 117—12 |
| 2,936,261 | 5/1960 | Cole | 156—309 |
| 3,036,930 | 5/1962 | Grimminger et al. | 117—93.31 |
| 3,038,523 | 6/1962 | Merck et al. | 156—393 |
| 3,051,666 | 8/1962 | Snoddon et al. | 156—333 |
| 3,091,536 | 5/1963 | Rusignuolo et al. | 117—138.8 |

FOREIGN PATENTS 565,261  10/1958  Canada.

OTHER REFERENCES

"Materials and Methods" (Materials in Design Engineering), pp. 96–100 cited, January 1957.

Report No. 56–4, September 1956, "Hypalon 20," by B. W. Fuller, pp. 21–23 cited.

ALEXANDER WYMAN, *Primary Examiner.*

CARL F. KRAFFT, EARL M. BERGERT, *Examiners.*

R. J. ROCHE, *Assistant Examiner.*